Aug. 18, 1942.   C. J. CRANE ET AL   2,293,044
RATE INDICATOR
Filed April 26, 1939   2 Sheets-Sheet 2
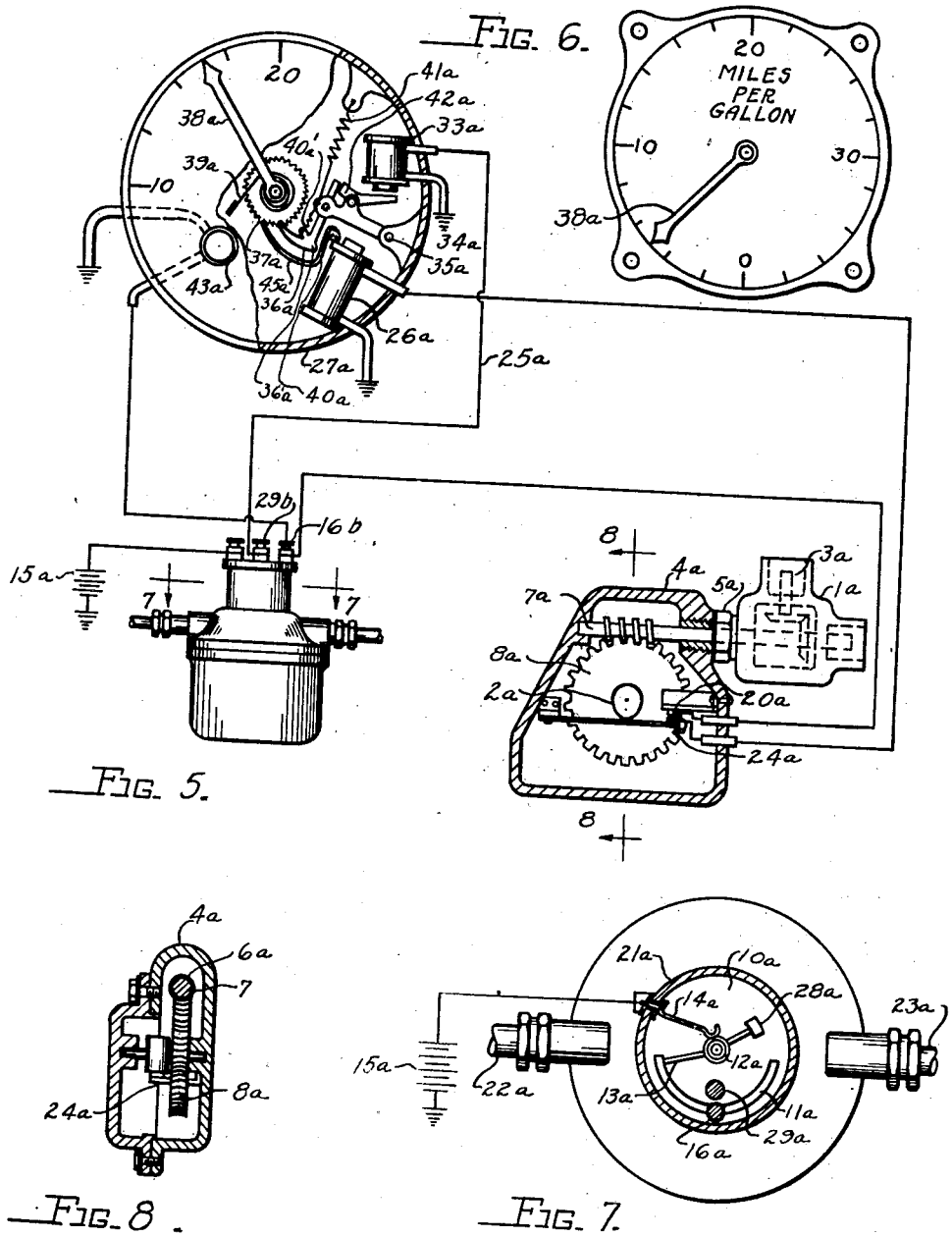
INVENTORS
CARL J. CRANE
FRANCIS G. NESBITT Patented Aug. 18, 1942

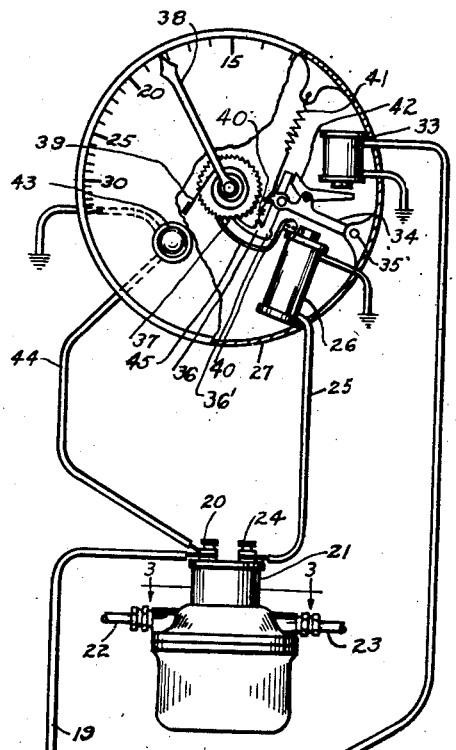
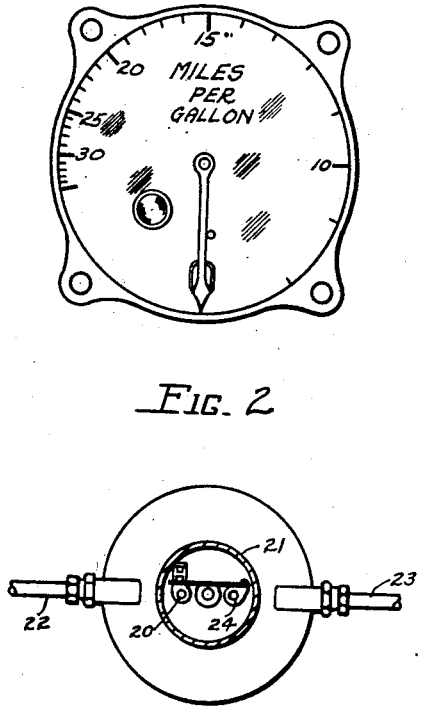
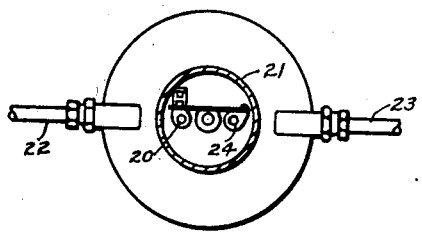
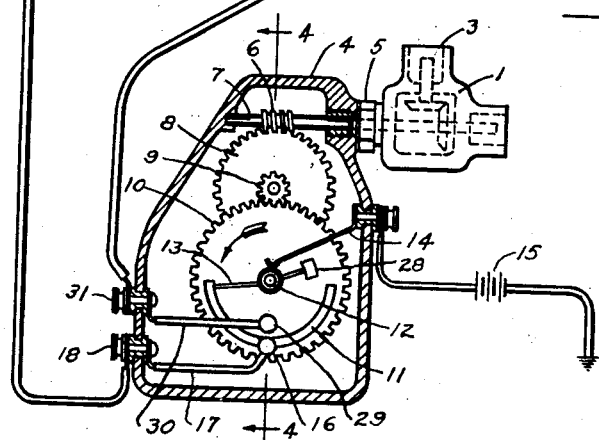

2,293,044

UNITED STATES PATENT OFFICE 2,293,044

RATE INDICATOR

Carl J. Crane, Montgomery, Ala., and Francis G. Nesbitt, Dayton, Ohio

Application April 26, 1939, Serial No. 270,142

4 Claims. (Cl. 235—61)

(Granted under the act of March 3, 1883, as amended April 30, 1928; 370 O. G. 757)

The invention described herein may be manufactured and used by or for the Government for governmental purposes, without the payment to us of any royalty thereon.

This application is a continuation in part of application Serial No. 212,740, filed June 9, 1938.

This invention comprises a liquid fuel consumption indicator based upon a well-known type of volume measuring meter. It is the purpose of this invention to provide a simple mechanism whereby the full accuracy of the positive displacement type meter may be used in obtaining a rate indication. The rate of consumption is indicated in convenient units, such as miles per gallon, in the preferred form of the invention. In the two typical examples of the invention, one embodies the measuring of units of volume consumed per unit of distance traveled, and the other embodies the measuring of units of distance traveled per unit of volume consumed.

In the drawings:

Figure 1 shows a diagrammatic arrangement of parts used in the device with certain of the parts broken away and shown in section;

Figure 2 illustrates an indicator dial;

Figure 3 is a sectional view taken on the lines 3—3 of Figure 1;

Figure 4 is a sectional view taken on the lines 4—4 of Figure 1;

Figure 5 is a view similar to Figure 1 but showing another embodiment of this invention;

Figure 6 illustrates the type of indicator dial used in connection with the embodiment shown in Figure 5;

Figure 7 is a section along the lines 7—7 of Figure 5;

Figure 8 is a section along the lines 8—8 of Figure 5.

In the embodiment of this invention illustrated in Figures 1 to 4, units of volume are measured per unit of distance traveled and indicated by suitable mechanism on a scale as distance per unit of volume.

The distance measuring device is intended to be connected to the vehicle whose distance of travel is to be measured and as illustrated is adapted for connection to the speedometer driving means (not shown) of the vehicle. This is accomplished by means of an adapter 1 that is connected with the speedometer driving means through a shaft 3, the speedometer (not shown) being connected to said driving means through beveled gears on shafts 3 and 7 respectively. Worm 6 is carried on shaft 7 and meshes with gear 8 carrying pinion 9. Pinion 9 meshes with contact gear 10 which is made of insulating material. Contact gear 10 carries an electrical conduction contact segment 11 that is preferably molded therein. This segment is electrically connected by conductor 13 to slip ring 12, which is mounted on a boss integral with contact gear 10. Spring contact 14 rides on slip ring 12 and is electrically connected to one terminal of source of power 15, through a suitable terminal connection and conductor. The other terminal of source of power 15 is grounded to the frame of the vehicle. Contactor 16 rides on segment 11 and is connected by conductor 17 to binding post or terminal connection 18. Contactor 16 and segment 11 may be said to constitute a switch. Binding post 18 is connected by conductor 19 to terminal 20 of a conventional type of displacement meter 21. Meter 21 receives fuel from a supply tank (not shown) through pipe 22 and delivers it to a carburetor (not shown) through pipe 23. Meter 21 incorporates the conventional contact switch which closes every time a certain volume of fuel passes through the meter. Terminal 20 is connected to one side of the switch and terminal 24 is connected to the other. Terminal 24 is connected by conductor 25 to solenoid 26 installed inside of the indicating unit 27. The other lead of solenoid 26 is suitably grounded to the framework of the vehicle.

Contact gear 10 also carries a smaller electrical conduction contact segment 28 and on a different radius, and is connected electrically to slip ring 12. Segment 28 is adapted to engage contact 29 upon each revolution of gear 10. Segment 28 and contact 29 may be said to constitute a switch. Contact 29 is connected by means of conductor 30 to binding post 31, which is connected by conductor 32 to solenoid 33 within the indicator case 27. The other lead from solenoid 33 is suitably grounded to the framework of the vehicle. Arm 34 is pivotally attached to case 27 by pin 35 and carries a pawl 36 meshing with ratchet wheel 37 attached to shaft of pointer 38 for actuating the pointer when solenoid 26 is energized. Also attached to pointer shaft is one end of the hair spring 39, the other end of which is attached to the case 27. Pawl 36 is held in contact with ratchet wheel 37 by spring 40' and spring 41. Spring 40 is made of any suitable material, such as spring steel, and is fastened to the casing of the solenoid 26 in any suitable manner, such as by tap bolts, rivets, welding, or the like. Lever 42 is pivotally mounted on arm 34 and one end of lever 42 depresses pawl 36 when solenoid 33 is energized to release the pawl from the ratchet wheel and permit the spring 39 to reset the pointer to zero position. Pointer 38 may be held in indicating position while arm 36 is being retracted by spring 41 by any old and well known means. As an illustration of mechanism that could cooperate with pointer 38 to prevent it from returning to starting position when not engaged by 36, attention is invited to U. S. Patent No. 1,652,378 in which a speed indicating pointer is frictionally held in indicating position by a convex steel disc. Another means for preventing the pointer 38 from returning to starting position is to provide spring 40 with an arm 45 for engaging ratchet wheel 37. Arm 36 is provided with a knob 36' adapted to engage 40 to move 45 out of engagement with 37 when solenoid 33 is energized to release pointer 38 and allow it to return to starting position. Knob 36' is spaced a predetermined distance from spring 40 to enable pawl 36 to return to normal position in response to action of spring 41 after being actuated by solenoid 26. This space is sufficiently small to insure intended release of spring 40 by knob 36' in response to actuation of pawl 36 by lever 42 and solenoid 33. The indicator is provided with a "tell tale" lamp 43 that is electrically connected to the current source by means of conductor 44 to terminal 20 on the meter 21 and the other lead is grounded.

The operation of the device as illustrated in Figures 1 to 4 may be described as follows:

Since contact gear 10 is geared directly to the speedometer shaft, its rotation is proportional to the distance traveled by the vehicle. As contact gear 10 rotates in the direction shown by the arrow, contact is made between point 16 and segment 11. It will be seen that this contact is kept closed for a known distance, say for example, one mile or a fraction thereof. During the time that contact is made between 11 and 16, solenoid 26 is energized momentarily every time a known volume of fuel passes through meter 21 by virtue of the contact made at terminals 20 and 24.

Each time solenoid 26 is energized, lever 34 is pulled toward the solenoid causing the pawl 36 to rotate ratchet wheel 37 a desired amount. This action causes the pointer 38 to progress over the scale from zero in a clockwise direction. It is obvious that the more frequent the circuit is closed at terminals 20 and 24, the more fuel is going through the meter every mile or fraction thereof, as defined by segment 11. At the end of the mile, or fraction thereof, contact gear 10 has rotated so that point 16 is no longer touching segment 11 and therefore the circuit is broken, allowing pointer 38 to remain stationary on its scale by virtue of pawl 36 and ratchet 37. The pointer may now be read directly on the scale in terms of miles per gallon just obtained for the previous mile, or fraction thereof. As contactor wheel 10 continues to rotate through the angle between the end of segment 11 and the beginning of segment 28, which as illustrated corresponds to approximately three-quarters of a mile, the pointer remains stationary on the scale and may be read directly in miles per gallon at any time during this period. When segment 28 makes contact with the point 29, solenoid 33 is energized, operating lever 42 and releasing pawl 36 and arm 45 from ratchet wheel 37, allowing pointer 38 to be returned to its zero position on the scale by hair spring 39. As the vehicle proceeds, contactor wheel 10 continues to rotate until point 16 again contacts segment 11, at which point the cycle is repeated. "Telltale" lamp 43 will remain lighted continuously during the time contact 16 is making electrical contact with segment 11, warning the operator not to read the pointer while it is moving. As soon as contact 16 leaves segment 11, the lamp goes out, indicating the pointer may be read.

In a further embodiment of this invention, and as illustrated in Figures 5 to 8, units of distance traveled are measured per unit of volume consumed. The parts and arrangement thereof are substantially the same as in Figures 1 to 4, except that the indicating continues during the consumption of a unit volume of fuel, units of traveled distance being indicated for the unit of volume.

The distance measuring device is connected to the speedometer driving means of the vehicle by an adaptor 1a in which is housed a shaft 3a carrying a beveled gear which meshes with a beveled gear on shaft 7a. Worm gear 6a on shaft 7a rotates gear 8a, carrying cam 2a which operates a switch having contacts 20a and 24a, the latter contact being carried by a flat spring mounted on housing 4a.

Mounted in volume measuring device 21a to rotate in a counter-clockwise direction is member 10a made of insulated material and having placed therein electrical conducting contacts 11a and 28a. Contacts 16a and 11a may be said to form a switch, as may also contacts 28a and 29a. Member 10a rotates with the volume measuring means (of well known conventional construction) and 11a is made of such length as to be in contact with 16a, which in turn is electrically connected to 16b, while a unit volume of fluid is passing through the volume measuring device. When 11a and 16a are not in contact, the circuit is open and the indicating means may be read. When 10a rotates until 28a contacts 29a, electrically connected to 29b, solenoid 33a is energized to operate lever 42a for releasing 36a and 45a, allowing pointer 38a to return to starting position. Electrical energy is supplied from a suitable source 15a to 11a and 28a by conductors 14a, 12a and 13a.

In the operation of the device, since the volume measuring means, distance measuring means, and rate indicating means are electrically connected in series, the series connection will be closed while 11a is in contact with 16a. Contact 11a is made of an extent to represent a suitable unit of volume, and it therefore follows that, since solenoid 26a is actuated to move pointer 38a upon each rotation of cam 2a, the number of contacts made by the distance measuring means represents the number of units of distance traveled for the unit of fuel consumed.

Light 43a is electrically connected, as in the first embodiment, to be lighted during the indicating period and dark during the reading period.

While applicants have shown and described several embodiments of their invention by way of illustration, various changes may be made by those skilled in the art without departing from the spirit of this invention, and it will be understood that applicants do not intend to limit their invention other than by the scope of the appended claims.

What we claim as new and desire to secure by Letters Patent is:

1. An indicator including a rotatably mounted pointer means, means for actuating said pointer means comprising a solenoid actuated lever pivotally connected to said indicator, a pawl pivotally connected to said lever, said pawl engaging and moving said pointer means a given distance for each actuation of said solenoid, means for holding said pointer in indicating position, means on said pawl for engaging said holding means to move it to pointer releasing position, and solenoid actuated cam means on said lever for moving said pawl into said pointer releasing position.

2. A rate-measuring device comprising means for measuring unit volume; means for measuring unit distance; a switch operatively connected with said volume-measuring means and a switch operatively connected with said distance-measuring means, one of said switches being actuated upon the passage of each unit and the other of said switches being closed during the passage of a unit and open during another interval, an indicator means; means biasing said indicating means to its zero or starting position; means for operating said indicator means including a solenoid electrically connected in series with said switches; means for holding said indicating means in indicating position; and means for releasing said indicator means for return to zero or starting position including a second solenoid and a third switch operatively associated with the measuring means to which said other of said switches is connected, said third switch being actuated during the said other interval.

3. A rate-measuring device comprising means for measuring unit volume including electrical contacts constituting a first switch actuated upon the passage of each unit volume; means for measuring unit distance including electrical contacts constituting a second switch which is closed during the passage of a unit distance and open during the passage of another distance; an indicating means and means for operating the same including a solenoid electrically connected in series with said switches; means for biasing said indicating means to zero or starting position; means for holding said indicating means in indicating position; and indicator-releasing means including other electrical contacts constituting a third switch operatively connected with said unit-distance-measuring means, and a second solenoid electrically connected in circuit with said third switch, said third switch being actuated when said second switch is open and after said second switch has been open for a predetermined indicator-reading time.

4. A rate-measuring device comprising means for measuring unit distance, and electrical contacts constituting a first switch operatively connected therewith to be actuated thereby upon the passage of each unit distance; means for measuring unit volume and electrical contacts constituting a second switch operatively connected therewith to be closed during the passage of a unit volume and open during the passage of another volume; an indicating means and a means for operating the same including a solenoid electrically connected in series with said two switches; means for biasing said indicating means to zero or starting position; means for holding said indicating means in indicating position; and indicator-releasing means including other electrical contacts constituting a third switch operatively connected with said unit-volume-measuring means, and a second solenoid electrically connected in circuit with said third switch, said third switch being actuated when said second switch is open and after said second switch has been open for a predetermined indicator-reading time.

CARL J. CRANE.
FRANCIS G. NESBITT.